United States Patent
Kim et al.

(10) Patent No.: US 11,512,166 B2
(45) Date of Patent: *Nov. 29, 2022

(54) METHOD AND SYSTEM FOR MANUFACTURING ESTER-BASED COMPOSITION

(71) Applicant: LG CHEM, LTD., Seoul (KR)

(72) Inventors: Hyun Kyu Kim, Daejeon (KR); Jeong Ju Moon, Daejeon (KR); Hyoung Jun, Daejeon (KR); Sung Kyu Lee, Daejeon (KR); Chan Hyu Jin, Daejeon (KR); Joo Ho Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 324 days.

This patent is subject to a terminal disclaimer.

(21) Appl. No.: 16/838,778

(22) Filed: Apr. 2, 2020

(65) Prior Publication Data

US 2020/0317861 A1 Oct. 8, 2020

(30) Foreign Application Priority Data

Apr. 4, 2019 (KR) .................. 10-2019-0039717
Mar. 30, 2020 (KR) .................. 10-2020-0038459

(51) Int. Cl.

| *B01J 4/00* | (2006.01) |
|---|---|
| *B01J 19/00* | (2006.01) |
| *B01J 19/24* | (2006.01) |
| *C08G 63/183* | (2006.01) |
| *C08G 63/78* | (2006.01) |
| *C08G 63/85* | (2006.01) |
| *C08L 67/03* | (2006.01) |

(52) U.S. Cl.
CPC ........ *C08G 63/785* (2013.01); *B01J 19/0013* (2013.01); *B01J 19/0053* (2013.01); *C08G 63/183* (2013.01); *C08G 63/85* (2013.01); *C08L 67/03* (2013.01); *B01J 2219/0004* (2013.01); *B01J 2219/00051* (2013.01)

(58) Field of Classification Search
CPC ....... B01J 4/00; B01J 4/02; B01J 19/00; B01J 19/0006; B01J 19/0013; B01J 19/0053; B01J 19/24; B01J 19/245; B01J 2219/00; B01J 2219/00002; B01J 2219/00027; B01J 2219/00033; B01J 2219/0004; B01J 2219/00049; B01J 2219/00051; B01J 2219/00054; B01J 2219/00056; B01J 2219/00058; B01J 2219/00063; B01J 2219/00191; B01J 2219/00193; B01J 2219/00195; B01J 2219/00198; B01J 2219/00204; B01J 2219/00243; C08G 63/00; C08G 63/02; C08G 63/12; C08G 63/16; C08G 63/18; C08G 63/181; C08G 63/183; C08G 63/78; C08G 63/785; C08G 63/82; C08G 63/85

See application file for complete search history.

(56) References Cited

U.S. PATENT DOCUMENTS

| 8,901,344 B2 * | 12/2014 | Peters ................... B01D 3/38 560/99 |
| 2007/0112173 A1 | 5/2007 | Kampf |
| 2011/0251420 A1 | 10/2011 | Disteldorf et al. |
| 2011/0301377 A1 | 12/2011 | Peters et al. |
| 2015/0141691 A1 | 5/2015 | Disteldorf et al. |
| 2019/0263745 A1 | 8/2019 | Lee et al. |
| 2020/0317599 A1 * | 10/2020 | Kim ................... B01J 4/02 |

FOREIGN PATENT DOCUMENTS

| CN | 102295564 B | 7/2013 | |
| EP | 405332 B2 * | 6/2001 | ............. C07C 67/08 |
| GB | 1086132 A | 10/1967 | |
| JP | 4935611 B1 | 9/1974 | |
| JP | 2020506167 A | 2/2020 | |
| KR | 1020060128819 A | 12/2006 | |
| KR | 1020110101205 A | 9/2011 | |
| KR | 1020110101206 A | 9/2011 | |
| KR | 1020130042742 A | 4/2013 | |
| KR | 10-1354141 B1 | 1/2014 | |
| KR | 101663586 B1 | 10/2016 | |
| KR | 1020190027623 A | 3/2019 | |

OTHER PUBLICATIONS

Machine translation of KR 101663586B1, which was published on Oct. 10, 2016 (Year: 2016).*
Janjua.(2007).Systemic Uptake of Diethyl Phthalate, Dibutyl Phthalate, and Butyl Paraben Following Whole-Body Topical Application and Reproductive and Thyroid Hormone Levels in Humans. Environ. Sci. Technol. vol. 14, pp. 5564-5570.
Rahman, (2004).The Plasticizer Market: an Assessment of Traditional Plasticizers and Research Trends to Meet New Challenges. Prog. Polym. Sci. vol. 29. pp. 1223-1248.

* cited by examiner

*Primary Examiner* — Natasha E Young
(74) *Attorney, Agent, or Firm* — Dentons US LLP

(57) ABSTRACT

The present disclosure relates to a method for continuously manufacturing an ester-based composition and a manufacturing system therefor, the method improving a manufacturing yield by optimizing process variables of each reactor of a reaction unit in which a plurality of reactors are connected in series.

12 Claims, No Drawings

METHOD AND SYSTEM FOR MANUFACTURING ESTER-BASED COMPOSITION

CROSS-REFERENCE TO RELATED APPLICATIONS

This application claims the benefit of and priority to Korean Application No. 10-2019-0039717, filed on Apr. 4, 2019, and Korean Application No. 10-2020-0038459, filed on Mar. 30, 2020, all of which are incorporated by reference in their entirety for all purposes as if fully set forth herein.

TECHNICAL FIELD

The present invention relates to a manufacturing method and a manufacturing system for increasing the manufacturing efficiency of an ester-based composition by optimizing process variables of a plurality of reactors connected in series.

BACKGROUND ART

Phthalate-based plasticizers had occupied 92% of the world's plasticizer market by the 20th century (Mustafizur Rahman and Christopher S. Brazel "The plasticizer market: an assessment of traditional plasticizers and research trends to meet new challenges" Progress in Polymer Science 2004, 29, 1223-1248), and are additives used to improve the processability of polyvinyl chloride (hereinafter, referred to as PVC) by imparting flexibility, durability, cold resistance, and the like and lowering viscosity during melting. Phthalate-based plasticizers are introduced into PVC in various contents and used not only for hard products such as rigid pipes, but also for soft products such as food packaging materials, blood bags, and flooring materials since the phthalate-based plasticizers are soft and stretchable. Thus, the phthalate-based plasticizers are more closely related to real life than any other materials and are widely used for materials which come into direct contact with a human body.

However, despite the compatibility with PVC and excellent softness imparting properties of phthalate-based plasticizers, there has been controversy over the harmful nature of the phthalate-based plasticizers in that when a PVC product containing a phthalate-based plasticizer is used in real life, the phthalate-based plasticizer may be leaked little by little out of the product and act as a suspected endocrine disruptor (environmental hormone) and a carcinogen to the level of a heavy metal (N R Janjua et al. "Systemic Uptake of Diethyl Phthalate, Dibutyl Phthalate, and Butyl Paraben Following Whole-body Topical Application and Reproductive and Thyroid Hormone Levels in Humans" Environmental Science and Technology 2007, 41, 5564-5570). Particularly, since a report was published in the 1960s in the United States that diethylhexyl phthalate (di-(2-ethylhexyl) phthalate, DEHP), the most used phthalate plasticizer, leaked out of PVC products, global environmental regulations have started to be implemented in addition to various studies on the harmful nature of the phthalate-based plasticizer on human bodies, boosted by increasing interest in environmental hormones in the 1990s.

Thus, in order to respond to environmental hormonal problems and environmental regulations due to the leakage of phthalate-based plasticizers, many researchers have been conducting research in order to develop a new non-phthalate-based alternative plasticizer without phthalic anhydride used in the manufacturing of phthalate-based plasticizers, or to develop a leakage suppression technology which suppresses the leakage of phthalate-based plasticizers, thereby significantly reducing risks to human bodies and which meets environmental standards.

Meanwhile, as non-phthalate-based plasticizers, terephthalate-based plasticizers not only have an equivalent level of physical properties with phthalate-based plasticizers, but also have been spotlighted as a material free from environmental problems, so that various types of terephthalate-based plasticizers have been developed. In addition, research on developing terephthalate-based plasticizers with excellent physical properties as well as research on equipment for manufacturing such terephthalate-based plasticizers have been actively conducted, and there has been a demand for more efficient, more economical and simpler process designs in terms of process design.

PRIOR ART DOCUMENT (Patent Document 1) Korean Patent Laid-Open Publication No. 10-1354141
(Non-patent Document 1) Mustafizur Rahman and Christopher S. Brazel "The plasticizer market: an assessment of traditional plasticizers and research trends to meet new challenges" Progress in Polymer Science 2004, 29, 1223-1248
(Non-patent Document 2) N. R. Janjua et al. "Systemic Uptake of Diethyl Phthalate, Dibutyl Phthalate, and Butyl Paraben Following Whole-body Topical Application and Reproductive and Thyroid Hormone Levels in Humans" Environmental Science and Technology 2007, 41, 5564-5570

DISCLOSURE OF THE INVENTION

Technical Problem

An aspect of the present invention provides an efficient method and an efficient system for manufacturing an ester-based composition, the method and the system in which a plurality of reactors are disposed in series and process variables of each reactor are optimized such that an ester-based composition is efficiently and continuously manufactured.

Technical Solution

According to an aspect of the present invention, there is provided a method for manufacturing an ester-based composition, the method including a step S1 of injecting a polycarboxylic acid and alcohol having 3 to 10 alkyl carbon atoms into a mixer to form a reaction mixture, a step S2 of continuously injecting the reaction mixture into a reaction unit in which a total of N reactors are connected in series from a first reactor to an N-th reactor, thereby continuously manufacturing reaction products, a step S3 of continuously moving the reaction products into a separation unit to remove unreacted alcohol, and a step S4 of injecting the unreacted alcohol removed from the separation unit back into one or more reactors selected from the reactors of the reaction unit, wherein N is an integer of 3 or greater and the step S2 satisfies the following Formulas 1) and 2).

$$T_{n1-1} \leq T_{n1} \qquad 1)$$

$$E_{n2-1} \geq E_{n2} \geq E_1 \qquad 2)$$

In Formulas above, n1 is an integer of 2 to N, and n2 is an integer of 3 to N.

$T_x$=Temperature of an x-th reactor $E_x$={(Number of moles of alcohol injected into an x-th reactor−c*Number of moles of polycarboxylic acid injected into an x-th reactor/c*Number of moles of polycarboxylic acid injected into the first reactor)*100%} c is the number of carboxylic acid groups contained in one molecule of the polycarboxylic acid.

According to another aspect of the present invention, there is provided a system for manufacturing an ester-based composition, the system including a mixer in which a reaction mixture of a polycarboxylic acid and alcohol having 3 to 10 alkyl carbon atoms is formed, a reaction unit having N number of reactors connected in series in which an esterification reaction of the reaction mixture is performed, a separation unit including one or more separation columns for receiving reaction products and removing unreacted alcohol therefrom, a recovery unit for injecting the unreacted alcohol removed from the separation unit back into a reactor of the reaction unit, and a variable control unit for controlling the temperature of each reactor and the amount of alcohol injected into the reactor.

Advantageous Effects

A manufacturing method and a manufacturing system of the present invention allow an ester-based composition to be efficiently manufactured by designing a process such that a plurality of reactors disposed in series are continuously used and optimizing process variables of each of the reactors disposed in series.

BEST MODE FOR CARRYING OUT THE INVENTION

Examples

Hereinafter, preferred Examples are presented to aid in understanding of the present invention. However, the following Examples are merely illustrative of the present invention and are not intended to limit the scope of the present invention.

As a polycarboxylic acid, high purity terephthalic acid (PTA), which is a dicarboxylic acid, was used. As alcohol, 2-ethylhexanol was used. As a catalyst, tetra (2-ethylhexyl) titanate was used. The amount of energy consumed in each of Examples 1 to 5 and Comparative Examples 1 to 4 was calculated using Tables 1 to 4. A reaction unit was composed of three reactors connected in series. Meanwhile, in Tables 1 to 4 below, the final reaction conversion rate of each of Examples is written as 99.9% based on the termination of an actual reaction, and it is apparent that the conversion rate of the present invention may be set to 99.99% or greater in order to minimize the loss of reaction raw materials. The conversion rate below was calculated based on the amount of water produced from the reaction, and the termination of the reaction was based on the acid value (KOH mg/g) of 0.1 of a reactant.

TABLE 1

|  | Example 1 | | | Example 2 | | | Example 3 | | |
| --- | --- | --- | --- | --- | --- | --- | --- | --- | --- |
|  | Reactor 1 | Reactor 2 | Reactor 3 | Reactor 1 | Reactor 2 | Reactor 3 | Reactor 1 | Reactor 2 | Reactor 3 |
| Reaction duration (hr) | 2.5 | 2 | 2 | 2.5 | 2 | 2 | 2.5 | 2 | 2 |
| Amount of catalyst used (wt % with respect to PTA) |  | 0.3 |  |  | 0.3 |  |  | 0.3 |  |
| Raw material injection mole (PTA, 2-EH) | 100, 200 | 48, (96 + 80) | 9, (18 + 80) | 100, 200 | 48, (96 + 80) | 10, (20 + 80) | 100, 240 | 50, (140 + 40) | 10, (60 + 40) |
| Conversion rate (%) | 52 | 91 | 99.9 | 52 | 90 | 99.9 | 50 | 90 | 99.9 |
| T (° C.) | 200 | 220 | 220 | 200 | 220 | 230 | 200 | 220 | 220 |
| E (%) | 0 | 40 | 40 | 0 | 40 | 40 | 20 | 40 | 40 |
| Energy (KWh) | 66 | 72 | 15 | 65 | 73 | 18 | 74 | 72 | 15 |
| Total energy (KWh) |  | 153 |  |  | 156 |  |  | 161 |  |

TABLE 2

|  | Example 4 | | | Example 5 [CB1] | | |
| --- | --- | --- | --- | --- | --- | --- |
|  | Reactor 1 | Reactor 2 | Reactor 3 | Reactor 1 | Reactor 2 | Reactor 3 |
| Reaction duration (hr) | 2.5 | 2 | 2 | 2.5 | 2 | 2 |
| Amount of catalyst used (wt % with respect to PTA) |  | 0.3 |  |  | 0.3 |  |
| Raw material injection mole (PTA, 2-EH) | 100, 140 | 60, (60 + 140) | 7, (−46 + 140) | 100, 200 | 49, (98 + 80) | 10, (20 + 80 + 10) |
| Conversion rate (%) | 25 | 93 | 99.9 | 0 | 40 | 35 |
| T (° C.) | 200 | 220 | 220 | 200 | 219 | 220 |
| E (%) | −30 | 40 | 40 | 0 | 40 | 35 |
| Energy (KWh) | 60 | 79 | 13 | 66 | 72 | 14 |
| Total energy (KWh) |  | 152 |  |  | 152 |  |

TABLE 3

|  | Comparative Example 1 | Comparative Example 2 | | |
|---|---|---|---|---|
|  | Batch reactor | Reactor 1 | Reactor 2 | Reactor 3 |
| Reaction duration (hr) | 6 | 2.5 | 2 | 2 |
| Amount of catalyst used (wt % with respect to PTA) | 0.3 | | 0.3 | |
| Raw material injection mole (PTA, 2-EH) |  | 100, 200 | 50, (100 + 80) | 10, (20 + 80) |
| Conversion rate (%) | 99.9 | 50 | 90 | 97.3 (not terminated) |
| T (° C.) | 220 | 200 | 220 | 210 |
| E (%) | 60 | 0 | 40 | 40 |
| Energy (KWh) | 198 | 65 | 71 | 13 |
| Total energy (KWh) | 198 | | 149 | |

TABLE 4

|  | Comparative Example 3 | | | Comparative Example 4 | | |
|---|---|---|---|---|---|---|
|  | Reactor 1 | Reactor 2 | Reactor 3 | Reactor 1 | Reactor 2 | Reactor 3 |
| Reaction duration (hr) | 2.5 | 2 | 2 | 2.5 | 2 | 2 |
| Amount of catalyst used (wt % with respect to PTA) | | 0.3 | | | 0.3 | |
| Raw material injection mole (PTA, 2-EH) | 100, 200 | 52, (104 + 80) | 12, (28 + 80 + 40) | 100, 200 | 52, (104 + 80) | 124 (28 + 80 + 40) |
| Conversion rate (%) | 48 | 88 | 99.9 | 48 | 86 | 99.9 |
| T (° C.) | 200 | 218 | 220 | 200 | 215 | 216 |
| E (%) | 0 | 40 | 60 | 0 | 40 | 60 |
| Energy (KWh) | 64 | 71 | 70 | 63 | 69 | 51 |
| Total energy (KWh) | | 205 | | | 156 | |

From the results of Tables 1 to 4, it was confirmed that the continuous process of the present invention was able to achieve an energy saving of about 20% compared to a typical batch process (Comparative Example 1). In addition, it was confirmed that when the process variable conditions (conditions of E and T) of the present invention were satisfied, less energy was used, or the reaction was smoothly completed compared to a case in which the process variable conditions were not satisfied (Comparative Example 2-4).

Specifically, in the case of Comparative Example 2 in which the temperature in the last reactor was lowered, thereby not meeting the conditions of T, the conversion rate did not reach 99.9% even though the reaction was performed for the same duration of time as in the case of Examples. As a result, a lot more time was required to complete the actual reaction, so that it was confirmed that Comparative Example 2 was inefficient compared to Examples. In addition, in the case of Comparative Examples 3 and 4 in which the conditions of E were not satisfied due to the addition of alcohol to the last reactor, the amount of energy used to heat alcohol which did not participate in the actual reaction among the added alcohol was increased, so that it was confirmed that the energy consumption of each of Comparative Examples 3 and 4 was greater than that of each of Examples.

MODE FOR CARRYING OUT THE INVENTION

Hereinafter, the present invention will be described in more detail.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

In a manufacturing method and a manufacturing system of the present invention, a polycarboxylic acid refers to a compound having two or more carboxylic acid groups, for example, a dicarboxylic acid, a tricarboxylic acid, or a tetracarboxylic acid. A polycarboxylic acid used in the present invention may have 2 to 5 carboxylic acid groups, 2 to 4 carboxylic acid groups, or 2 to 3 carboxylic acid groups. When a polycarboxylic acid has too many carboxylic acid groups, it may not easy to apply the polycarboxylic acid to the manufacturing method or the manufacturing system of the present invention due to a high molecular weight of the polycarboxylic acid itself. The polycarboxylic acid is preferably a dicarboxylic acid, a tricarboxylic acid, or a tetracarboxylic acid. The dicarboxylic acid may be one or more selected from the group consisting of a linear dicarboxylic acid having 2 to 10 carbon atoms, a terephthalic acid, a phthalic acid, an isophthalic acid, and a cyclohexane dicarboxylic acid, and the tricarboxylic acid may be one or more selected from the group consisting of a citric acid, a trimellitate acid, and a cyclohexane tricarboxylic acid. The tetracarboxylic acid may be one or more selected from the group consisting of a benzenetetracarboxylic acid, a furantetracarboxylic acid, a cyclohexane tetracarboxylic acid, and a tetrahydrofuran tetracarboxylic acid. In addition, the polycarboxylic acid may not only include itself, but also include an anhydride or a derivative thereof.

In the manufacturing method and the manufacturing system of the present invention, it is preferable that alcohol having 3 to 10 alkyl carbon atoms is one or more selected from the group consisting of propanol, butanol, pentanol, hexanol, heptanol, octanol, nonanol and decanol, all of which are of a linear type or a branched type. In addition, the alcohol may be alcohol of a single type, or may be in the form of a mixture containing isomers having the same number of carbon atoms. For example, when the alcohol is alcohol having 3 alkyl carbon atoms, the alcohol may be 1-propanol or 2-propanol, or may be in the form of a mixture containing 1-propanol and 2-propanol in a predetermined ratio. When the alcohol is in the form of a mixture containing isomers having the same number of carbon number, the relative amount of each isomer is not particularly limited.

Method for Manufacturing Ester-Based Composition

The present invention provides a method for manufacturing an ester-based composition, the method including a step S1 of injecting a polycarboxylic acid and alcohol having 3 to 10 alkyl carbon atoms into a mixer to form a reaction mixture, a step S2 of continuously injecting the reaction mixture into a reaction unit in which a total of N reactors are connected in series from a first reactor to an N-th reactor, thereby continuously manufacturing reaction products, a step S3 of continuously moving the reaction products into a separation unit to remove unreacted alcohol, and a step S4 of injecting the unreacted alcohol removed from the separation unit back into any one reactor of the reaction unit, wherein N is an integer of 3 or greater.

Mixing Step (S1)

The manufacturing method of the present invention includes the step S1 of injecting a polycarboxylic acid and alcohol having 3 to 10 alkyl carbon atoms into a mixer to form a reaction mixture.

Specifically, the step S1 for forming the reaction mixture is a step of uniformly mixing the polycarboxylic acid and the alcohol having 3 to 10 carbon atoms in the mixer. In the present step, before the polycarboxylic acid and the alcohol having 3 to 10 carbon atoms, which correspond to reaction raw materials, are injected into a reactor, the polycarboxylic acid and the alcohol having 3 to 10 carbon atoms are uniformly pre-mixed in the mixer, so that it is possible to solve non-uniform reaction-related problems which may occur when the raw materials are directly injected into the reactor without being pre-mixed, for example, a problem of varying conversion rates depending on the position inside the reactor.

In the manufacturing method of the present invention, in addition to mixing a polycarboxylic acid and alcohol, the step S1 may further include a step in which the reaction mixture is heated to 50-200° C., preferably 60-190° C., more preferably 70-180° C. In order to subject the reaction mixture to a reaction, it is necessary to supply energy to the reaction mixture. If the reaction mixture is pre-heated and injected into a reactor before being heated and subjected to a full-scale reaction in a subsequent step S2, the reaction mixture may be reacted more efficiently and faster in the reactor. However, if an elevated temperature in the step S1 is too low, the effect of pre-heating before injection is poor, so that it may be rather uneconomical. If heated to an excessively high temperature and injected into a reactor, the polycarboxylic acid and the alcohol, which are reaction raw materials, may be vaporized, or the like, so that a uniform reaction may not rather proceed or the loss of the reaction raw materials may occur.

Reaction Step (S2)

The method for manufacturing an ester-based composition of the present invention includes the step S2 of continuously injecting the reaction mixture into a reaction unit in which N reactors are connected in series to perform a reaction, thereby continuously manufacturing reaction products from the reaction unit.

In the present invention, an esterification reaction is performed using a plurality of reactors connected in series. When a reaction unit not having just one reactor but having a plurality of reactors connected in series is used, a smaller reactor may be used compared to a case in which one reactor is used, so that the space design of a process is easy, thereby reducing design costs, and since reaction raw materials continuously pass though the plurality of reactors connected in series, process variables for each reactor may be independently controlled to allow the optimization of the entire process, thereby maximizing the efficiency of the manufacturing process.

Particularly, the process variables of the step 2 in the manufacturing method of the present invention may satisfy the following Relation Formulas 1) and 2).

$$T_{n1-1} \leq T_{n1} \quad\quad\quad 1)$$

$$E_{n2-1} \geq E_{n2} \geq E_1 \quad\quad\quad 2)$$

In Formulas above, n1 is an integer of 2 to N, and n2 is an integer of 3 to N.

$T_x$=Temperature of an x-th reactor $E_x$={(Number of moles of alcohol injected into an x-th reactor−c*Number of moles of polycarboxylic acid injected into an x-th reactor/c*Number of moles of polycarboxylic acid injected into the first reactor)*100%} c is the number of carboxylic acid groups contained in one molecule of the polycarboxylic acid.

The E value means, based on the "amount of alcohol required to allow a polycarboxylic acid initially injected from a first reactor to be reacted to 100%," the ratio of the amount of alcohol additionally injected to the amount of alcohol required to allow a polycarboxylic acid injected into each reactor to be reacted to 100%." The amount means an amount based on moles. For example, when a polycarboxylic acid is a dicarboxylic acid, and the dicarboxylic acid is injected in an amount of 100 moles and alcohol is injected in an amount of 300 moles into a reactor, the amount of alcohol for allowing the dicarboxylic acid to react to 100% is 200 moles, and thus, the amount of alcohol to be additionally injected is 100 moles. Therefore, an E value, which is a ratio thereof, corresponds to 50%, which is a ratio of 100 moles to 200 moles. The E value may be controlled through a step S4 to be described later or a method for removing or adding alcohol between the reactors connected in series.

The inventor of the present invention has found that it is possible to optimize a continuous ester-based composition manufacturing process by controlling the temperature of each reactor and the E value in each reactor to satisfy Relation Formulas 1) and 2) above. Particularly, the inventor of the present invention has confirmed that when the above Relation Formulas are satisfied, the amount of an ester-based composition to be manufactured may be maximized and the amount of the composition to be manufactured per unit time may also be maximized while the amount of wasted reaction raw materials is minimized.

Particularly, in the step S2, the lower limit of $T_1$ may be 100° C., 120° C., 140° C., 160° C., or 180° C., and the upper limit of $T_1$ may be 220° C. or 200° C. In addition, the lower limit of $T_n$ may be 140° C., 160° C., 180° C., 200° C., or 220° C., and the upper limit of $T_n$ may be 220° C., 230° C., 240° C., or 250° C. When $T_1$ and $T_N$ are too low, heat is not sufficiently supplied during a reaction, resulting in an insufficient conversion rate. When too high, the loss of reaction raw materials may be great due to the vaporization or the like of alcohol.

Also, the lower limit of $E_1$ may be −30%, −20%, −10%, 0%, or 10%, and the upper limit of $E_1$ may be 80%, 70%, 60%, 50%, or 40%. The lower limit of $E_N$ may be a value higher than the lower limit of $E_1$, specifically 0%, 10%, or 20%, and the upper limit of $E_N$ may be equal to or lower than the upper limit of $E_1$, specifically 80%, 70%, 60%, 50%, or 40%. When $E_1$ and $E_N$ are too low or too high, two reaction raw materials are not balanced, so that some reaction raw materials are wasted, and as a result, a composition may not be manufactured in a maximum amount. Particularly, when the E value of a first reactor is too high, alcohol is injected in excess amount from the beginning, resulting in a large amount of alcohol which does not participate in a reaction. In this case, a desired degree of conversion rate is not achieved, or too much energy is consumed to heat the alcohol not participating in the reaction, so that there may be a problem of deteriorating the efficiency of the entire reaction process.

In the manufacturing method of the present invention, N is preferably an integer of 3 or greater, more preferably an integer of 3 to 10. When the number of reactors is less than the above, a technical advantage of disposing a plurality of reactors in series may not be prominent, and when the number of reactors is too high, the number of reactors is too large, the process variable adjustment in each reactor becomes difficult and costs consumed for relevant apparatuses including the reactors are rather increased, so that it may be inefficient in terms of the costs for the entire process.

Separation Step (S3)

The manufacturing method of the present invention includes the step S3 of continuously moving the reaction products into a separation unit to remove unreacted alcohol.

Specifically, in the step S3, reaction products manufactured from the N-th reactor, which is the last reactor of the plurality of reactors, are continuously moved to a separation unit, and then, unreacted alcohol is removed in the separation unit.

The separation unit used in the step S3 may include one or more separation columns. Depending on the number of stages of the separation column included in the separation unit in the manufacturing method of the present invention, the composition ratio of a composition to be finally manufactured may vary. Those skilled in the art may appropriately adjust the number of stages of the separation column included in the separation unit according to the composition ratio or properties of the composition to be manufactured. In addition, the separation unit may include a purification tank of a drum type in addition to the separation column. The separation unit may remove the amount of unreacted alcohol included in the reaction products to a level of 30% or less, preferably 20% or less, more preferably 10% or less of the total. Since the unreacted alcohol is removed as described above, the physical properties of an ester-based composition to be manufactured may be uniform and excellent.

Re-Injection Step (S4)

The manufacturing method of the present invention includes the step S4 of injecting the unreacted alcohol removed from the separation unit back into one or more reactors selected from the reactors of the reaction unit.

Specifically, in the step S4, the unreacted alcohol removed from the separation unit is re-injected into one or more reactors among the first reactor to the N-th reactor of the reaction unit to control the E value of each reactor. In the Step 4, by increasing the amount of alcohol injected, it is possible to increase the E value of a corresponding reactor, and by decreasing the amount of alcohol injected, it is possible to decrease the E value of a corresponding reactor.

Catalyst Addition Step (S1-1 or S1-2)

The manufacturing method of the present invention may further include a step 51-1 of adding a catalyst to the reaction mixture between the step S1 and the step S2, or a step S1-2 of adding a catalyst to a polycarboxylic acid and alcohol having 3 to 10 alkyl carbon atoms before the step S1.

In the esterification reaction of alcohol and a carboxylic acid, a catalyst may be used, and when a catalyst is used, there is an advantage in that the reaction may be completed faster. The catalyst may be injected to a mixture of a dicarboxylic acid and alcohol, or to each of a polycarboxylic acid and alcohol before a mixture thereof is prepared. Particularly, it is preferable that the catalyst is added directly to alcohol in terms of the efficiency of the entire process.

The catalyst used in the manufacturing method of the present invention may be one or more selected from an acid catalyst such as sulfuric acid, hydrochloric acid, phosphoric acid, nitric acid, paratoluenesulfonic acid, methanesulfonic acid, ethanesulfonic acid, propanesulfonic acid, butanesulfonic acid, and alkyl sulfuric acid, a metal salt such as aluminum lactate, lithium fluoride, potassium chloride, cesium chloride, calcium chloride, iron chloride, and phosphoric acid, a metal oxide such as heteropoly acid, a natural/synthetic zeolite, a cation and anion exchange resin, and an organic metal such as tetraalkyl titanate and a polymer thereof, and may preferably be tetraalkyl titanate. As the tetraalkyl titanate, TiPT, TnBT, TEHT, or the like may be used, and it is preferable to use tetraalkyl titanate having the same alkyl group as the alkyl group of alcohol having 3 to 10 alkyl carbon atoms as a ligand. When a catalyst having the same alkyl group as a ligand is used, it is preferable because catalyst by-products which may be generated in a subsequent process are controlled or not generated.

The amount of a catalyst to be used may vary depending on the kind of the catalyst. In one example, a homogeneous catalyst may be used in an amount range of 0.001-5 wt %, 0.001-4 wt %, 0.01-3 wt %, or 0.01-2 wt % based on 100 wt % of the reaction mixture, and a heterogeneous catalyst may be used in an amount range of 5-200 wt %, 5-150 wt %, 10-150 wt %, or 20-150 wt % based on the total weight of the reaction mixture.

Trans-Reaction Step (S4)

The manufacturing method of the present invention may further include a step S5 of injecting alcohol having 3 to 10 alkyl carbon atoms into the reaction products from which the unreacted alcohol is removed to perform a trans-esterification reaction, wherein the alcohol injected herein is different from the alcohol injected in the step S1.

Through the step S5, it is possible to manufacture a composition including two or more types of ester compounds. Those skilled in the art may select suitable alcohol according to the type of an ester compound to be included in the composition and perform a trans-esterification reaction. It is preferable that the step S5 is performed after the removal of unreacted alcohol. When the step S5 is performed before the removal of the unreacted alcohol, a trans-esterification reaction with newly injected alcohol may not be easily performed due to the remaining unreacted alcohol, and even the reaction is performed to a certain degree, the alcohol content is too high to deteriorate the efficiency of the reaction. Therefore, it is preferable that the amount of the unreacted alcohol included in the reaction products before the trans-esterification reaction is 10% or less.

System for Manufacturing Ester-Based Composition

The present invention provides a system for manufacturing an ester-based composition, the system including a mixer in which a reaction mixture of a polycarboxylic acid and alcohol having 3 to 10 alkyl carbon atoms is formed, a reaction unit having N number of reactors connected in series in which an esterification reaction of the reaction mixture is performed, a separation unit including one or more separation columns for receiving reaction products and removing unreacted alcohol therefrom, a recovery unit for injecting the unreacted alcohol removed from the separation unit back into a reactor of the reaction unit, and a variable control unit for controlling the temperature of each reactor and the amount of alcohol injected into the reactor.

The manufacturing system provided by the present invention is a system to be used for executing the manufacturing method of the present invention, and each of the components of the system is the same as that described above, and thus, a detailed description thereof will be omitted.

Particularly, the variable control unit included in the manufacturing system of the present invention determines the amount alcohol to be injected into each reactor of the total amount of the unreacted alcohol recovered, or the amount of alcohol moving between each reactor, and at the same time, controls the temperature of each reactor such that the Relation Formulas 1) and 2) above are satisfied, thereby serving to optimize the reaction in the reactor.

The invention claimed is:

1. A method for manufacturing an ester-based composition, the method comprising:
   a step S1 of injecting a polycarboxylic acid and an alcohol having 3 to 10 alkyl carbon atoms into a mixer to form a reaction mixture;
   a step S2 of continuously injecting the reaction mixture into a reaction unit in which a total of N reactors are connected in series from a first reactor to an N-th reactor, thereby continuously manufacturing reaction products;
   a step S3 of continuously moving the reaction products into a separation unit to remove the unreacted alcohol; and
   a step S4 of injecting the unreacted alcohol removed from the separation unit back into any one reactor of the reaction unit, wherein N is an integer of 3 or greater, and Formulas 1) and 2) are satisfied:

$$T_{n1-1} \leq T_{n1} \quad \quad 1)$$

$$E_{n2-1} \geq E_{n2} \geq E_1 \quad \quad 2)$$

wherein, in Formulas 1) and 2), n1 is an integer of 2 to N, and n2 is an integer of 3 to N,
   $T_x$=Temperature of an x-th reactor
   $E_x$={(Number of moles of the alcohol injected into an x-th reactor−c*Number of moles of polycarboxylic acid injected into an x-th reactor)/(c*Number of moles of polycarboxylic acid injected into the first reactor) *100%}
   wherein c is the number of carboxylic acid groups contained in one molecule of the polycarboxylic acid, and in $T_x$ and $E_x$, x is an integer of 1 to N.

2. The method of claim 1, wherein the separation unit comprises one or more separation columns or a purification tank of a drum type.

3. The method of claim 1, further comprising
   a step S1-1 of adding a catalyst to the reaction mixture between the step S1 and the step S2; or
   a step S1-2 of adding a catalyst to the polycarboxylic acid and the alcohol before the step S1.

4. The method of claim 3, wherein the catalyst is tetraalkyl titanate.

5. The method of claim 1, wherein the step S1 further comprises a step in which the reaction mixture is heated to 50-200° C.

6. The method of claim 1, wherein $T_1$ is 100-220° C. and $T_N$ is 200-250° C.

7. The method of claim 1, wherein $E_1$ is −30 to 80% and $E_N$ is 0 to 80%.

8. The method of claim 1, further comprising a step S5 of injecting the alcohol having 3 to 10 alkyl carbon atoms into the reaction products from which the unreacted alcohol is removed to perform a trans-esterification reaction, wherein the alcohol injected in the step S5 is different from the alcohol injected in the step S1.

9. The method of claim 1, wherein the polycarboxylic acid is one or more selected from the group consisting of a dicarboxylic acid, a tricarboxylic acid, and a tetracarboxylic acid.

10. The method of claim 9, wherein
    the dicarboxylic acid is one or more selected from the group consisting of a linear dicarboxylic acid having 2 to 10 carbon atoms, a terephthalic acid, a phthalic acid, an isophthalic acid, a cyclohexane dicarboxylic acid, an anhydride thereof, and a derivative thereof,
    the tricarboxylic acid is one or more selected from the group consisting of a citric acid, a trimellitate acid, a cyclohexane tricarboxylic acid, an anhydride thereof, and a derivative thereof, and
    the tetracarboxylic acid is one or more selected from the group consisting of a benzenetetracarboxylic acid, a furantetracarboxylic acid, a cyclohexane tetracarboxylic acid, a tetrahydrofuran tetracarboxylic acid, an anhydride thereof, and a derivative thereof.

11. A system for manufacturing an ester-based composition, the system comprising:
    a mixer in which a reaction mixture of a polycarboxylic acid and an alcohol having 3 to 10 alkyl carbon atoms is formed;
    a reaction unit having N number of reactors connected in series in which an esterification reaction of the reaction mixture is performed, wherein N is an integer of 3 or greater;
    a separation unit including one or more separation columns for receiving reaction products and removing the unreacted alcohol therefrom;
    a recovery unit for injecting the unreacted alcohol removed from the separation unit back into a reactor of the reaction unit; and
    a variable control unit that controls the temperature of each reactor and the amount of the alcohol injected into the reactor to satisfy Formulas 1) and 2) below:

$$T_{n1-1} \leq T_{n1} \quad \quad 1)$$

$$E_{n2-1} \geq E_{n2} \geq E_1 \quad \quad 2)$$

wherein, in Formulas 1) and 2), n1 is an integer of 2 to N, and n2 is an integer of 3 to N,
    $T_x$=Temperature of an x-th reactor
    $E_x$={(Number of moles of the alcohol injected into an x-th reactor−c*Number of moles of polycarboxylic acid injected into an x-th reactor)/(c*Number of moles of polycarboxylic acid injected into the first reactor) *100%}
    wherein c is the number of carboxylic acid groups contained in one molecule of the polycarboxylic acid, and in $T_x$ and $E_x$, x is an integer of 1 to N.

12. The system of claim 11, further comprising a trans-reaction unit for performing a trans-esterification reaction by adding the alcohol having 3 to 10 alkyl carbon atoms to the reaction products from which the unreacted alcohol has been removed, wherein the alcohol injected from the trans-reaction unit is different from the alcohol injected from the mixer.

\* \* \* \* \*